April 14, 1936.  C. E. MILLER  2,037,528
WIND MOTOR
Filed July 30, 1934  2 Sheets-Sheet 2
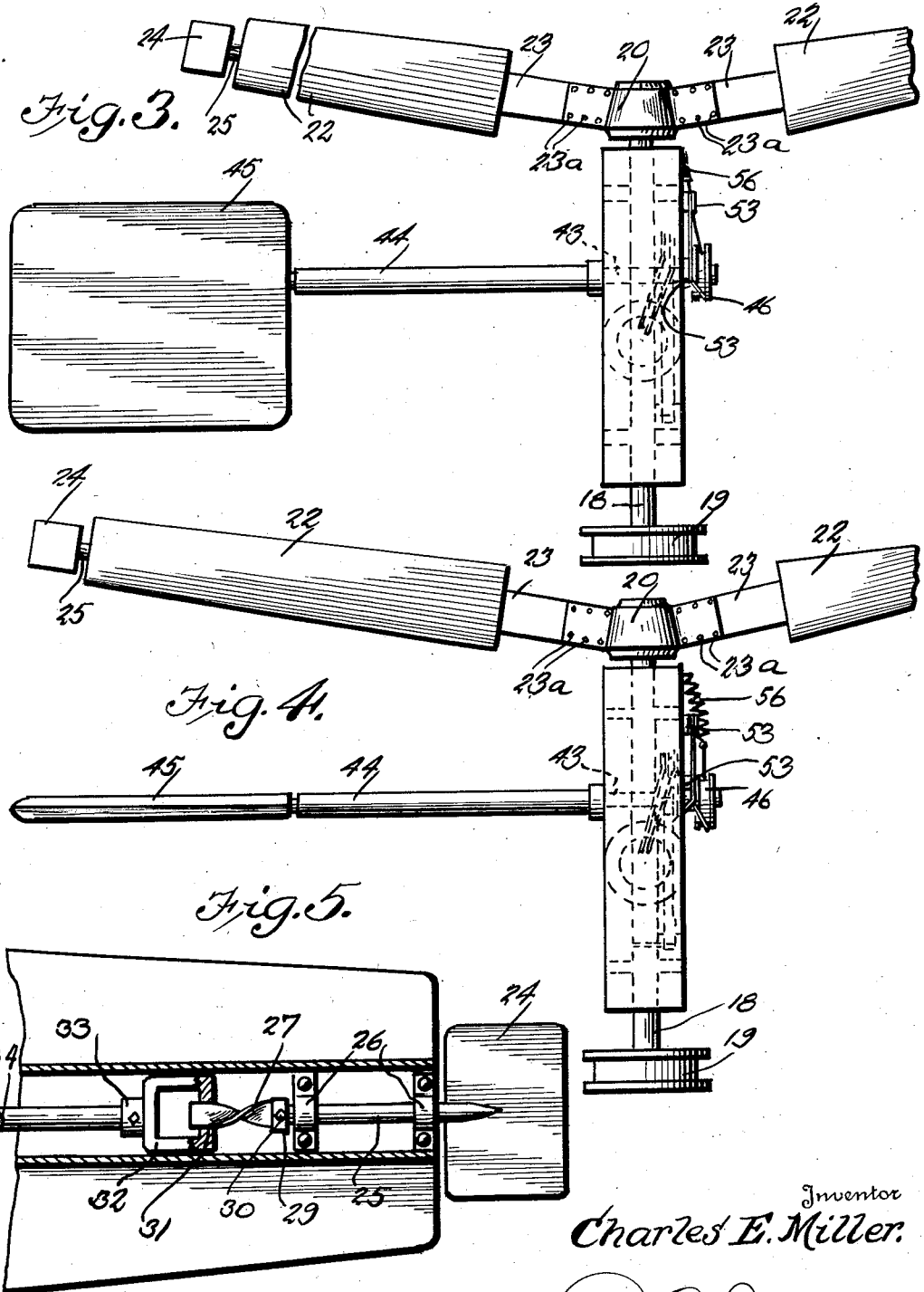

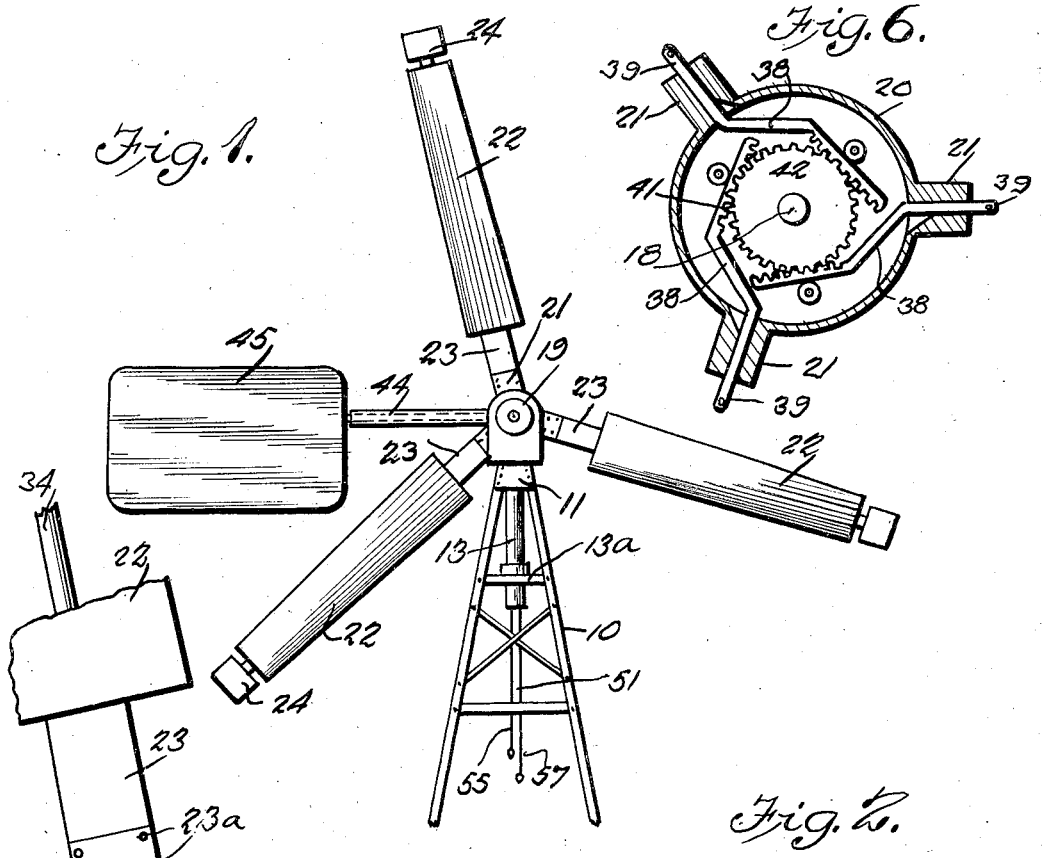

Patented Apr. 14, 1936

2,037,528

UNITED STATES PATENT OFFICE 2,037,528

WIND MOTOR

Charles E. Miller, Anderson, Ind.

Application July 30, 1934, Serial No. 737,656

3 Claims. (Cl. 170—68)

This invention relates to improvements in wind motors particularly intended for driving an electric generator.

The primary object of this invention is to provide a wind motor of the above mentioned character having automatic breaking means associated with the impeller blades operating under centrifugal force whereby the speed of the wind wheel may be held constant.

A further object of this invention is to provide a side vane for the wind wheel for the purpose of swinging the wind wheel out of the wind stream during gales having high velocity in order to prevent damage to the working parts of the wind motor and the resultant excessive electric current generated by the electric machine.

A still further object of this invention is to provide controlling means for the side vane whereby the same may be held in a vertical or horizontal position by means of simple manual controls.

A still further object of this invention is to provide a wind wheel having braking vanes carried by the ends of the wind wheel blades and means is provided for connecting the braking vanes whereby the same will be tilted in unison.

Other objects and advantages of the invention will become apparent during the course of the following description, taken with the accompanying drawings, wherein Figure 1 is a side elevational view of a wind wheel construction embodying this invention;

Figure 2 is a fragmentary enlarged elevation partly in section to clearly illustrate the working parts thereof;

Figure 3 is a top elevational view illustrating the side vane in its inoperative position;

Figure 4 is a similar view illustrating the side vane in its operative position for causing the deflection of the wind wheel with respect to the wind stream;

Figure 5 is a side elevation greatly enlarged and slightly in section of one of the wind wheel blades illustrating the braking vane and showing the manner in which the vanes are adapted to be tilted at right angles to the wind wheel vanes; and Figure 6 is a vertical cross-sectional view slightly enlarged, taken through the hub portion of the wind wheel to clearly illustrate the manner in which the braking vanes are connected to operate in unison.

In the drawings, wherein for the purpose of illustrating the invention and wherein like reference characters will be employed to designate like parts throughout the same, the reference character 10 will generally be employed to designate a skeleton tower having a cap member 11 upon which is seated the enlarged portion 12 of a tube 13. The tube 13 is rigidly secured to the cap member 11 and is further held in place by means of a supporting plate 13ᵃ.

Rotatably mounted on the tube 13 as by means of a bearing 14 is a U-shaped shaft support 15 having opposite bearings 16 and 17 for accommodating a rotary shaft 18.

Rigidly secured to one end of the rotary shaft 18 is a power take-off pulley 19 while secured to the opposite end of the shaft 18 is a hub 20 of a wind wheel.

Radial bosses 21 are formed integral with the hub 20 to which are secured wind wheel blades 22 that are hollow and are provided with reduced tubular inner ends 23. Rivets 23ᵃ may connect the tubular inner ends of the blades 22 to the bosses 21 of the hub as clearly shown in Figures 2, 3 and 4.

Each of the wind wheel blades 22 is provided with braking vanes 24 rotatably mounted in the free end of the blade and said vanes are provided with stub shafts 25 journaled in suitable bearings 26 formed in the outer ends of the blades as clearly illustrated in Figure 5. The inner end of the stub shaft 25 carries a spiral strap 27 held in place by means of a collar 29 fitted on the shaft and locked in place by a set screw 30. The spiral strap 27 is adapted to extend into a nut 31 carried by a yoke 32 having a suitable collar 33 secured on the outer end of a sliding shaft 34.

The shaft 34 adjacent its inner end carries lateral lugs 35 to which are secured the inner ends of coil springs 36 while the opposite ends of the springs are anchored as at 37. Said coil springs 36 are adapted to normally retain the shaft 34 towards the hub 20 and against centrifugal action of the wind wheel.

Angle bars 38, within the hub 20, each have a portion as at 39 guided in the hub bosses 21 and connected as at 40 to the slide rods 34. A rack bar 41 is formed on the other end of each of the angle bars 38 and the teeth of said rack bars are adapted to engage a toothed wheel 42 rotatably mounted on the shaft 18. The rack bars 41 and toothed wheel 42 are compactly arranged within the hub 20 of the wind wheel as clearly shown in Figure 6. By this arrangement, the braking vanes 24 may be caused to turn with respect to the impeller blades 22 in unison to the same angular degree.

Rotatably mounted in the U-shaped shaft support 15 as at 43 is a shaft 44 provided on the outer end with a deflecting vane 45 and having a pulley 46 rigidly secured to the opposite end. A sector-shaped keeper plate 47 is also rigidly secured to the shaft and is provided with a notch 48 adapted to receive a pawl 49 pivotally secured to the U-shaped support 15 as at 50. A controlling cord 51 has one of its ends secured to the pawl 49 as at 52 and said cord is adapted to pass over a pair of pulleys 53 journaled on the shaft support cover plate 54 whereby the free end of the controlling cord 51 may extend downwardly through the tube 13 as shown in Figures 1 and 2.

A manual control cable 55 is provided for tilting the vane 45 and said cable extends over and around the pulley 46 and has one of its ends connected to a coil spring 56 as at 57 and a pulley 58 is secured to the shaft support 15 for guiding the cable 55 through the center of the tube 13.

The coil spring 56 is anchored to the shaft support 15 as at 59 whereby a downward pull exerted upon the cable 55 will rotate the pulley 46 and cause the deflector vane 45 to be moved to a horizontal position after the latch 49 has been released from the notch 48 by a downward pull upon the cable 51.

The motor operates on the leeward side of its vertical support. In the event of a severe wind storm or gale the cable 55 may be operated to allow the deflector vane 45 to be moved to the position shown in Figure 2, whereby the latch 49 will drop into place in the notch 48 and retain the deflector vane 45 in a vertical position in order that the wind will swing the wind wheel sidewise with respect to the wind stream. In this manner, the wind wheel may be restrained from attaining a high speed resulting in damage to the electrical equipment. Also, the braking vanes 24 are operative to retard rotation of the wind motor by outward movements of the shafts 34 under centrifugal force to cause the braking vanes 24 to rotate by means of spiral straps 27 so as to present the face of the same at right angles to its plane of rotation, thus causing the same to drag through the air and retard or brake the rotation of the wind motor.

It is to be understood that the form of the invention herein shown and described is to be taken as the preferred embodiment of the same and that various changes in the shape, size, and arrangement of parts may be resorted to without departing from the spirit and scope of the invention as claimed.

I claim:—

1. A wind motor comprising a base, a rotary shaft support on said base, a shaft rotatably mounted in the support, a bladed wind wheel secured to the shaft, braking vanes connected to the free ends of the wind wheel blades, axial shafts connecting said vanes to the blades, a spiral strap mounted on the inner ends of each axial shaft, a nut threaded on the end of the spiral strap adapted to be thrust outwardly upon the attainment of a predetermined speed of the wind wheel whereby said vanes may be moved at right angles to the blades to effect a braking action.

2. A wind motor comprising a wind wheel having impeller blades, a braking vane rotatably mounted on the free end of each blade, a rotary shaft connecting the vane with the impeller blade, a spiral strap on the inner end of the rotary shaft, a nut threaded on the spiral strap adapted to be moved toward the free end of the impeller blade by centrifugal action for moving the vane relative to the blade to effect a braking action and means for normally holding the braking vane in alinement with the impeller blade.

3. A wind motor comprising a wind wheel having impeller blades, a braking vane rotatably mounted on the outer end of each blade, a rotary shaft connecting the vane with the impeller blade, a spiral strap fixed to the inner end of the shaft in line therewith and means mounted for centrifugal movements and associated with the spiral strap for moving the same relative to the blade to effect a braking action by the vane, said means being normally positioned relative to the spiral strap for holding the same in alinement with the impeller blade.

CHARLES E. MILLER.